May 13, 1958 K. H. SCHWARZ ET AL 2,834,373
GAS PRESSURE REGULATOR
Filed Nov. 9, 1954
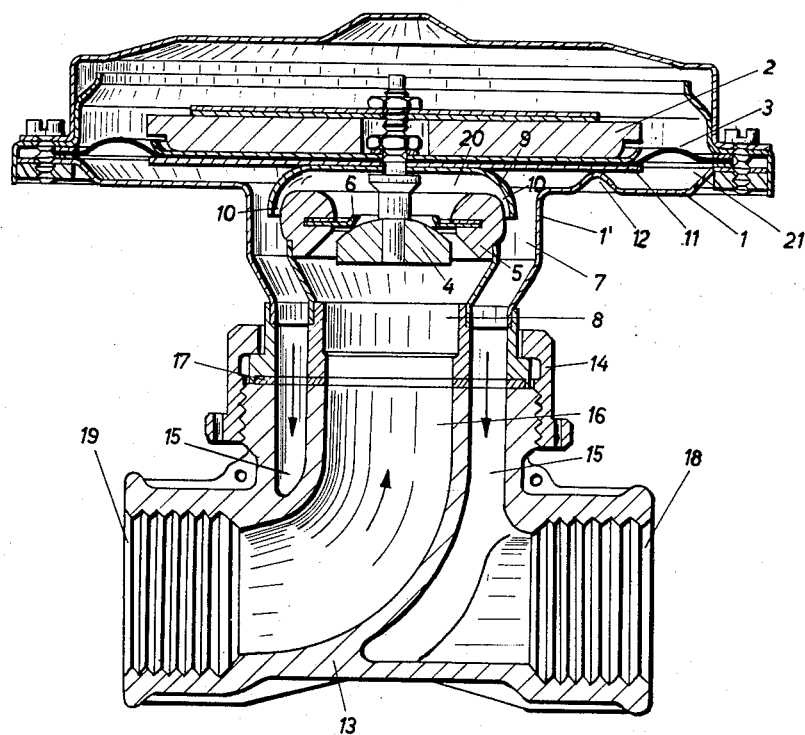
Inventor: Karl H. Schwarz
Josef Grabck

United States Patent Office 2,834,373
Patented May 13, 1958

2,834,373

GAS PRESSURE REGULATOR

Karl H. Schwarz, Chicago, Ill., and Josef Drabik, near Osnabruck, Germany, assignors to G. Kromschroder Aktiengesellschaft, Osnabruck, Germany Application November 9, 1954, Serial No. 467,697

Claims priority, application Germany November 12, 1953

4 Claims. (Cl. 137—484.2)

This invention relates to a gas pressure regulator having a loaded diaphragm-controlled regulating valve in which the regulated pressure at the discharge side of the regulator counteracts the diaphragm load. It is a well known phenomenon that with gas pressure regulators of this type the regulated pressure is more or less decreased as the demand for gas and consequent rate of flow gas through the regulator is increased. Furthermore, the regulating valve tends to open less than necessary to maintain the desired consumer line pressure as demand increases, a characteristic known as "falling regulating characteristic." It is already known to alter the back pressure acting on the diaphragm to compensate for this falling regulating characteristic. This is commonly effected by forming the gas discharge channel as a Venturi tube and taking off the diaphragm-operating back pressure at the throat of this Venturi. Another arrangement has also become known in which a suction depending upon demand is produced below the diaphragm in that the gas flowing through the discharge channel of the regulator passes by the curved end of a deflector which is inserted into the regulator casing to form an intermediate baffle.

This invention has for its object the production in especially effective manner and with simplest means such a demand responsive suction acting on the diaphragm to compensate for the falling regulating characteristic of a gas pressure regulator without necessitating complicated and expensive regulator structure.

According to the invention, this object is accomplished by attaching a bell-shaped baffle to the diaphragm over the open inner end of a central valve body containing the regulating valve seat and head whereby the skirt portion of the baffle extends increasingly into the annular discharge channel formed between the valve body and surrounding casing in increasingly overlapping relationship with the inner end portion of the valve body to form an annular throttling passageway with increasing throttling effect as increasing gas demand tends to lower the pressure in the discharge side of the regulator. This increasing loss in pressure due to throttling tends to increase the reduction in pressure due to increasing demand, resulting in increased movement of the diaphragm to compensate for the falling regulating characteristic of the regulator. This compensated pressure at the large working surface of the diaphragm determines the position of the regulating valve, the effect of the compensating decrement in pressure being to open the regulating valve to a somewhat greater extent than would result from operation of the regulator without the throttling effect just described. It should be understood that the arrangement of the regulator and direction of loading of the diaphragm are such that the back pressure on the discharge side of the regulator acts in opposition to the diaphragm loading to tend to close the regulating valve.

A preferred embodiment of the invention is illustrated in the accompanying drawing, the single figure being a vertical half-section of a gas pressure regulator having the falling regulating characteristic compensating structure.

A diaphragm 3 loaded by means of a weight 2 is fixed in the regulator casing 1. An open-ended tubular valve body forms a gas admission channel 8 and is mounted coaxially with diaphragm 3 to form an annular gas discharge channel 7 between the valve body and the cylindrical portion 1' of the regulator casing 1. The inner or upper open end of the tubular valve body terminates in a valve seat body 5 forming a toroidal surface at the terminus of the valve seat body and providing means for mounting a yieldable valve seat 6 which faces inwardly into the tubular valve body and gas admission chamber 8. A hemispherically shaped regulating valve head 4 is located within the tubular valve body and, being affixed to the diaphragm 3 by means of a suitable valve stem extending into the open inner terminus of the tubular valve body as shown, cooperates with valve seat 6 to control the rate of flow of gas from the admission channel into the regulator.

A bell-shaped baffle 9 is concentrically attached to the underside of the diaphragm and extends umbrella-like over the valve seat body 5 at the inner open end of the tubular valve body, the skirt portion of the bell-shaped baffle extending into the annular gas discharge channel 7 in overlapping relationship to the inner end portion of the tubular valve body, including valve seat body 5. The bell-shaped baffle, being attached to the diaphragm, moves toward and away from the valve body with movement of the diaphragm in the operation of the regulator, and the baffle 9 is of such size that it, together with the skirt portion, is always spaced from the tubular valve body structure, the opposed overlapping surfaces being generally parallel to form an annular throttling passageway 10 between the baffle and valve body structure. Casing 1 is embossed at 12 to form a stop engageable by diaphragm plate 11 to limit movement of the diaphragm toward the valve body structure and insure the existence of the throttling passageway and avoid closing of the regulating valve by the baffle.

Gas discharge and admission channels 7 and 8 disposed concentrically with respect to each other open into the corresponding channels of a fitting 13 to which the regulator is connected by means of a suitable threaded ring nut 14. As shown, the tubular valve body of the regulator and the portion of the casing surrounding the same terminate in a common plane, as does the structure of fitting 13 forming admission and discharge channels 16 and 15 connecting, respectively, with admission and discharge sockets 19 and 18 of the fitting, and connection of the regulator is conveniently accomplished with insertion of a suitable gasket 17 at the common connection plane of regulator and fitting. Structural strains are avoided by using this single connection and the regulator can be easily mounted and removed for repair or replacement.

In the operation of the regulator thus described, gas entering through the channels 16 and 8 flows through the regulating valve including valve head 4 and seat 6 and into the space 20 within bell-shaped baffle 9 beneath diaphragm 3 and beyond the inner end of the regulating valve body. The gas is deflected by baffle 9 and forced to flow radially into the annular throttling passageway 10 and thence into gas discharge channel 7 and fitting discharge channel 15 to the point of consumption. The effect of throttling the gas as it flows through the annular throttling passageway 10, a pressure loss, is manifested in discharge diaphragm chamber 21 with which discharge channel 7 is in communication. The pressure of the gas in chamber 21 counteracts the loading of the diaphragm due to weight 2 and exerts pressure against the large working surface of the diaphragm surrounding baffle 9. Thus, the reduction of gas pressure in discharge channel 7 which results from increasing demand at the point of gas consumption is augmented by the reduction in pressure due to the throttling of the gas stream as it flows through the annular throttling passageway 10, the effective pressure at the diaphragm in chamber 21 being the resultant of these two pressure-influencing factors. Since reduction of gas pressure in discharge channel 7 results from increasing demand, the responsive action of the regulator is to open the regulating valve under the influence of the loading of the diaphragm to permit increased flow of gas therethrough. As the diaphragm moves to open the valve by moving valve head 4 inwardly away from valve seat 6, the bell-shaped baffle 9 is also moved toward the valve body to cause the skirt portion thereof to extend increasingly into the discharge channel 7 in increasingly overlapping relationship with the inner end portion of the valve body, including valve seat body 5, to increase the throttling effect above described as increasing demand tends to lower the pressure in the discharge chamber. The throttling effect is increased both by reason of increased throttling of the gas stream by reason of movement of the baffle with respect to the valve body and also by reason of the increased rate of flow of gas through the regulator as a consequence of increased demand. It follows that the pressure drop in the throttling passageway 10 is increasingly proportional to increased demand. The increased pressure drop due to throttling results in increased movement of the diaphragm to open the regulator valve to a greater degree and thus to compensate for the falling regulating characteristic of the regulator. Full compensation by this means is possible.

The throttling of the gas in the manner described has an additional advantage in that increase in regulator discharge pressure resulting from the reduction of demand to zero is somewhat lessened. The time lag after the gas is shut off in the consumption line and before the diaphragm operates to close the regulator valve causes this increased pressure in the consumer line. The magnitude of this increase depends upon the quantity of gas that is permitted to flow through the regulator valve after consumption is discontinued. Throttling of the gas flow, as described, tends to reduce this flow and thus reduce the excessive pressure.

The invention is claimed as follows:

1. A gas pressure regulator of the type described comprising a casing, an open-ended tubular valve body mounted in one end of said casing and forming a gas admission channel and defining with said casing an annular gas discharge channel, said body having an inwardly facing valve seat at the inner end thereof, a loaded diaphragm disposed within said casing beyond the inner end of said valve body coaxially therewith, a valve head arranged within said valve body and adapted to cooperate with said valve seat and a valve stem connecting said valve head with said diaphragm, said diaphragm defining with said casing a discharge pressure chamber communicating with said discharge channel and so arranged that gas pressure within said chamber acts upon said diaphragm in opposition to the loading thereof to tend to move said valve head toward said valve seat to reduce the flow of gas through said valve body into said discharge channel, and a bell-shaped baffle concentrically attached to said diaphragm and having the skirt portion thereof adapted to extend increasingly into said discharge channel in increasingly overlapping relationship with the inner end portion of said valve body as increasing gas demand tends to lower the pressure in said discharge chamber and increase the rate of flow of gas through said regulator, the opposed surfaces of the overlapping portions of said baffle and valve body being generally parallel to form an annular throttling passageway therebetween, the form and arrangement being such that movement of said diaphragm to increase the rate of flow of gas through said regulator also moves said baffle to increase the throttling effect of the throttling passageway whereby to further lower the pressure in said discharge chamber and cause increased action of said diaphragm and valve head to permit increased flow of gas and thus to compensate for the falling regulating characteristic of the regulator.

2. A gas pressure regulator in accordance with claim 1 wherein the inner end of the valve body terminates in a toroidal surface adapted to cooperate with the bell-shaped baffle to form an annular throttling passageway commencing substantially radially of said valve body and continuing over the toroidal surface and along the inner end portion of said tubular valve body.

3. A gas pressure regulator in accordance with claim 1 wherein at least the outer end portion of the tubular valve body and the portion of the casing there surrounding are concentric and terminate in a common plane whereby the regulator is adapted to be connected to a single fitting having inlet and discharge passageways registering with the interior of said valve body and the annular discharge channel of the regulator surrounding said valve body.

4. A gas pressure regulator in accordance with claim 1 and including stop means arranged to limit movement of the diaphragm toward the valve body to a position spaced from the end thereof whereby to prevent closing of the throttling passageway.

References Cited in the file of this patent

UNITED STATES PATENTS

| Re. 21,597 | Niesemann | Oct. 8, 1940 |
| 218,325 | Shannon | Aug. 5, 1879 |
| 226,479 | Blair | Apr. 13, 1880 |
| 237,034 | Merritt | Jan. 25, 1881 |
| 2,515,252 | Niederer | July 18, 1950 |
| 2,671,989 | Schwarz | Mar. 16, 1954 |

FOREIGN PATENTS

| 284 | Great Britain | Jan. 5, 1909 |